United States Patent
Palanca et al.

(10) Patent No.: US 6,434,673 B1
(45) Date of Patent: Aug. 13, 2002

(54) OPTIMIZED CONFIGURABLE SCHEME FOR DEMAND BASED RESOURCE SHARING OF REQUEST QUEUES IN A CACHE CONTROLLER

(75) Inventors: Salvador Palanca, Gold River; Lokpraveen B. Mosur, Rancho Cordova, both of CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 09/607,794

(22) Filed: Jun. 30, 2000

(51) Int. Cl.$^7$ .......................... G06F 12/00; G06F 13/18
(52) U.S. Cl. ...................... 711/133; 711/100; 711/143; 711/151
(58) Field of Search ................. 711/100, 118, 711/133, 143, 151, 154, 158

(56) References Cited

U.S. PATENT DOCUMENTS

| | | | |
|---|---|---|---|
| 5,581,729 A * 12/1996 | Nishtala et al. | ............. | 711/143 |
| 5,634,068 A *  5/1997 | Nishtala et al. | ............. | 711/141 |
| 5,655,100 A *  8/1997 | Ebrahim et al. | ............. | 711/144 |
| 5,657,472 A *  8/1997 | Loo et al. | ................... | 711/158 |
| 5,684,977 A * 11/1997 | Loo et al. | ................... | 711/143 |
| 5,905,998 A *  5/1999 | Ebrahim et al. | ............. | 711/144 |
| 6,038,645 A *  3/2000 | Nanda et al. | ................ | 711/141 |
| 6,266,743 B1 *  7/2001 | Carpenter et al. | .......... | 711/143 |

* cited by examiner

*Primary Examiner*—Tuan V. Thai
(74) *Attorney, Agent, or Firm*—Blakely, Sokoloff, Taylor & Zafman LLP

(57) ABSTRACT

A method is provided that includes a step for setting a maximum number of concurrently allocated queue entries to service writeback evictions. The method also includes a step of setting a register bit based on cache requests. The method also includes a step for dynamically selecting, based on the register bit set, one of a cache management scheme based on a maximum number of programmable writeback entries and a cache management scheme allowing both writeback entries and incoming core requests to be allocated in in any free entry based on priority. According to another embodiment of the invention, a computer system is provided that includes at least one computer processor. The computer processor provided has at least one cache memory and a cache controller. Further included is a register coupled to the computer processor. Also, a memory bus is provided that is coupled to the computer processor. A memory is included that is coupled to the memory bus. A controller for dynamically selecting between a cache management scheme based on a maximum number of programmable writeback entries and a cache management scheme allowing both writeback entries and incoming core requests to be allocated based on priority is also included. The controller for dynamically selecting between one of a cache management scheme based on a maximum number of programmable writeback entries and a cache management scheme allowing both writeback entries and incoming core requests to be allocated based on priority includes a register bit within the register that is capable of being set and cleared. The computer processor queries the register to determine if the register bit is either set and cleared.

26 Claims, 5 Drawing Sheets

OPTIMIZED CONFIGURABLE SCHEME FOR DEMAND BASED RESOURCE SHARING OF REQUEST QUEUES IN A CACHE CONTROLLER

BACKGROUND OF THE INVENTION

1. Field of the Invention

The present invention relates to a method for optimizing cache service requests.

2. Background Information

Caches are memory storage devices, and a microprocessor may have multiple cache levels. The cache situated closest to the processor typically has the smallest size and fastest access time. The cache situated farthest from the processor typically has a larger size and slower access time than a cache situated closest to the processor. The caches situated farthest from the processor typically take up significant die size. Also, the size of a cache is dependent upon, among other things, the access time, power, die size, etc.

Depending upon the addressing scheme and cache architecture, different addresses can map to the same set in a cache. As the size of the cache becomes smaller, the number of addresses mapped into a single set increase. Upon an incoming data request, a tag comparison is done to determine whether the request is a hit or miss. The status of the line is also checked to determine if the data in the cache is valid. A cache miss indicates that the data in the cache is from a different address, or it is not valid. When new data is written into the cache from the processor core, the status of the line is updated to a modified state.

On a cache miss to a given cache address, the data can be fetched and replaced into the cache either from main memory or a higher level cache. Before this new data is replaced into the cache, however, any modified data that already exists in the cache needs to be written back to main memory or to a cache further away from the processor core. These writebacks are also known as "dirty victims." They are the consequence of cache misses to a set with previously modified data. These writebacks to main memory slow down incoming cacheable requests to the same set, as the latter need to wait for the cache eviction to occur before they can complete the replace into the cache.

The number of writebacks occurring in a given period of time is typically a function of the cache size, architectural implementation of the cache and number of cache misses. Typical cache controllers allocate a queue with certain number of request entries that are exclusively used to service cache writebacks. A separate queue or set of buffers also exist to exclusively service incoming core cacheable and uncacheable requests, as shown in FIG. 1. While the scheme of allocating a preset number of entries for exclusive servicing of writebacks is easy to implement, this scheme may leave entries unused for long periods of time when there are no evictions. Therefore, the die size allocated to hardware resources will not be fully used.

Typical cache controllers have separate request entries to service writebacks and incoming core requests. Even with a cache controller designed to only have a single queue, as illustrated in FIG. 2, a fixed predetermined number of the controller's request entries are allocated exclusively to service writeback evictions. Since both writeback request entries and core request entries store data and addresses, the die size area for each of these entries is similar. A given entry can therefore service either a writeback eviction or a core request without any die size impact.

Consider an integrated microprocessor system in which the cache farthest from the processor is shared with CPU (central processing unit) and graphics data. The cache may exist in either a shared mode, where the cache contains both CPU and graphics data, or a CPU only mode, where the cache contains only CPU data. The cache mode is typically programmable and the shared portion of the cache is flushed upon a context switch, i.e., when the mode changes from shared to CPU only mode. During a context switch, multiple back-to-back writebacks occur, while no incoming core requests are accepted. In a system with separate queues, only the writeback entries are used during a context switch. Therefore, the entries allocated for servicing core requests are idle. This results in a loss of bandwidth to and from the cache.

DETAILED DESCRIPTION

The invention generally relates to an efficient cache management scheme. Referring to the Figures, exemplary embodiments of the invention will now be described. The exemplary embodiments are provided to illustrate the invention and should not be construed as limiting the scope of the invention. Before describing the embodiments of the invention, a brief discussion for ease of understanding will be introduced.

A writeback transaction typically takes two micro-operations. The first micro-operation returns hit/miss information from the cache. The second micro-operation is typically an eviction. The eviction takes place only if the first micro-operation is a cache miss, and the victim cache line is dirty or in modified state. Based on the outcome of the first micro-operation, the cache controller can predict when the next eviction from the cache into a queue will occur. The cache controller can then allocate a free entry for the dirty line before it schedules the evict operation to the cache. The entry is allocated for a writeback only if the outcome of the incoming cacheable core request (first micro-operation) is a miss, and the line in the cache mapping to the same set and pointed to by the LRU (Least Requested Unit) is dirty. This mode of operation allows the cache controller to allocate an entry for the writeback transaction only on demand, therefore maximizing the usage of the available queue entries.

Figure 1:
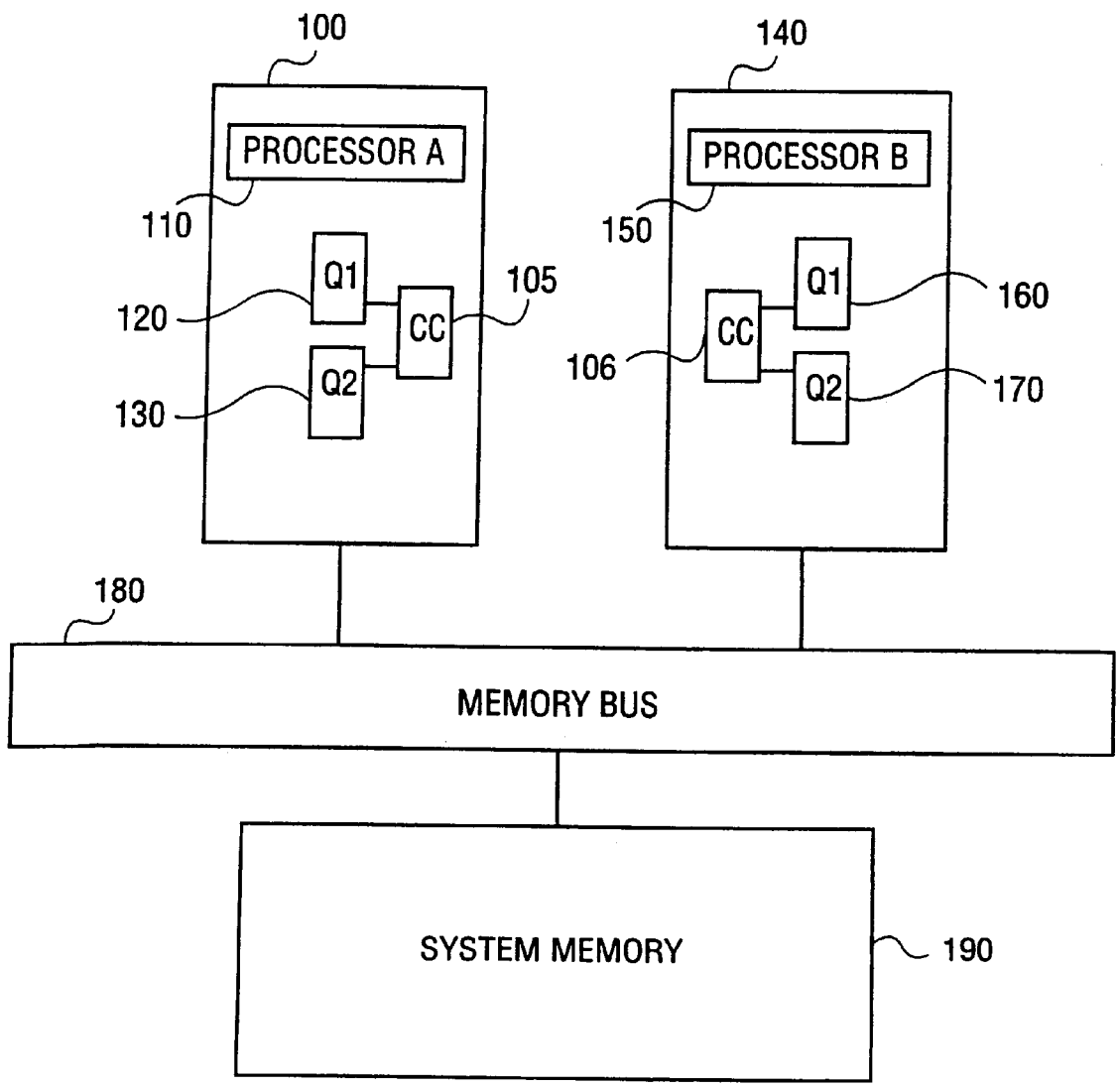
FIG. 1 illustrates a system having a cache configuration implementing two queues.

By allowing the incoming core request entries to service writeback evictions, separate exclusive writeback entries are no longer needed as long as the number of entries allocated to service incoming core request entries are sufficient to support writebacks while maintaining or improving the overall system performance. This is generally the case as in a system with separate queues, like the system shown in FIG. 1, the number of entries used for incoming core requests is larger than those used for writeback evictions. Therefore, in such a system, the entries allocated exclusively for writebacks can be eliminated. Sharing the incoming core request entries to service writeback evictions can result in significant die size savings, while maintaining or even improving overall system performance.

Figure 2:
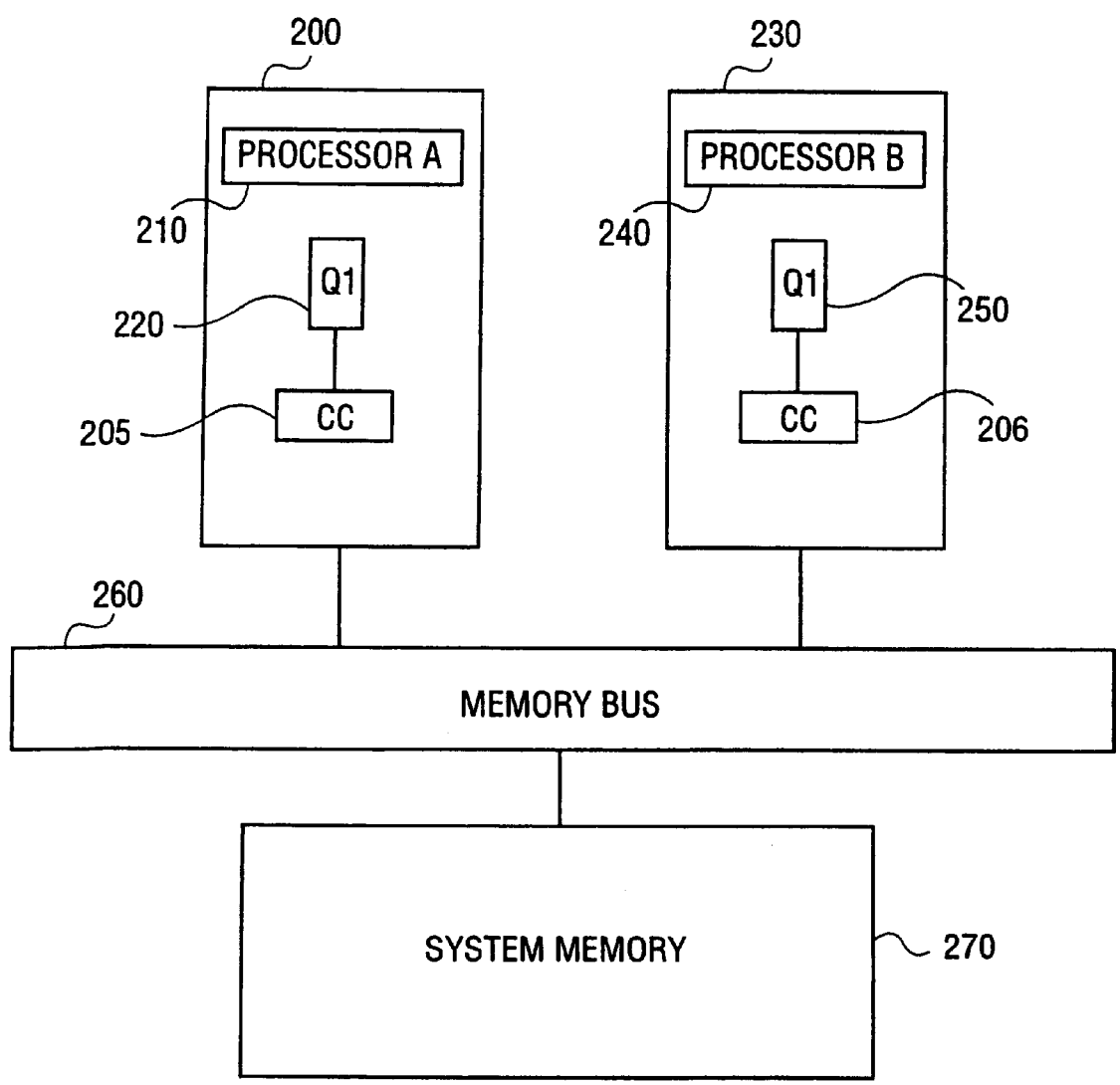
FIG. 2 illustrates a system having a cache configuration implementing a single queue.
Figure 3:
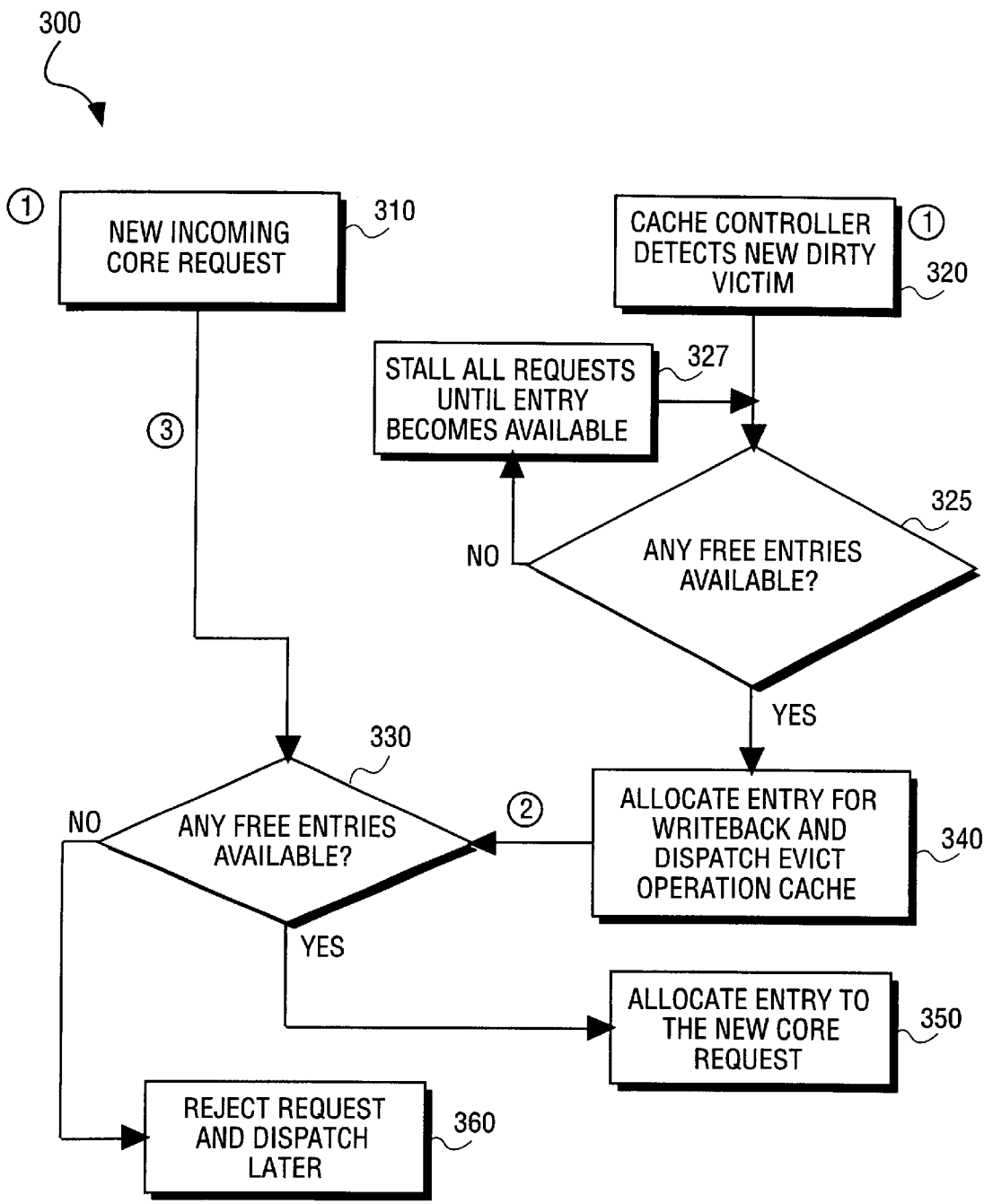
FIG. 3 illustrates an embodiment of the invention where any and all available entries are used for either writeback evictions or incoming core requests.

FIG. 2 shows a system having a single cache queue. FIG. 3 shows an embodiment of the invention using a single queue implementation where any and all available entries can be used for either writeback evictions or incoming core requests. In this embodiment, all available free request entries can be used for writeback evictions. Writeback evictions are given higher priority over incoming core requests. Giving higher priority to writeback evictions is especially useful when the system architecture calls for frequent flushing of the caches. In this embodiment, while cache controller 205 or 206 is in the middle of a cache flush, cache controller 205 or 206 rejects any incoming core requests. By allowing all entries to be used for writeback evictions, the use of the entries is maximized. In a typical cache controller in which a fixed number of request entries is allocated to service writebacks and core requests, entries not allocated to writeback evictions would be unused during a cache flush. Examples of cache flushes include a WBINVD (write back and invalidate cache) routine and a context switch to enter or exit "shared mode" for an integrated system cache that shares two or more different types of data, i.e., greaphics and/or DSP and/or CPU data. The WBINVD routine flushes internal cache, then signals the external cache to write back current data followed by a signal to flush the external cache.

In the embodiment illustrated in FIG. 3, any incoming core request is accepted as long as there is a free queue entry, which is not being requested simultaneously for a writeback eviction. Writeback and core transactions are stalled if all queue entries are full. Writeback evictions are stalled only if all entries are full. When there is a single entry free, an incoming core request is accepted only if there is not a writeback eviction competing for the free entry. If there is more than one entry free, both a writeback eviction and an incoming core request can be accepted into the queue simultaneously.

Figure 4:
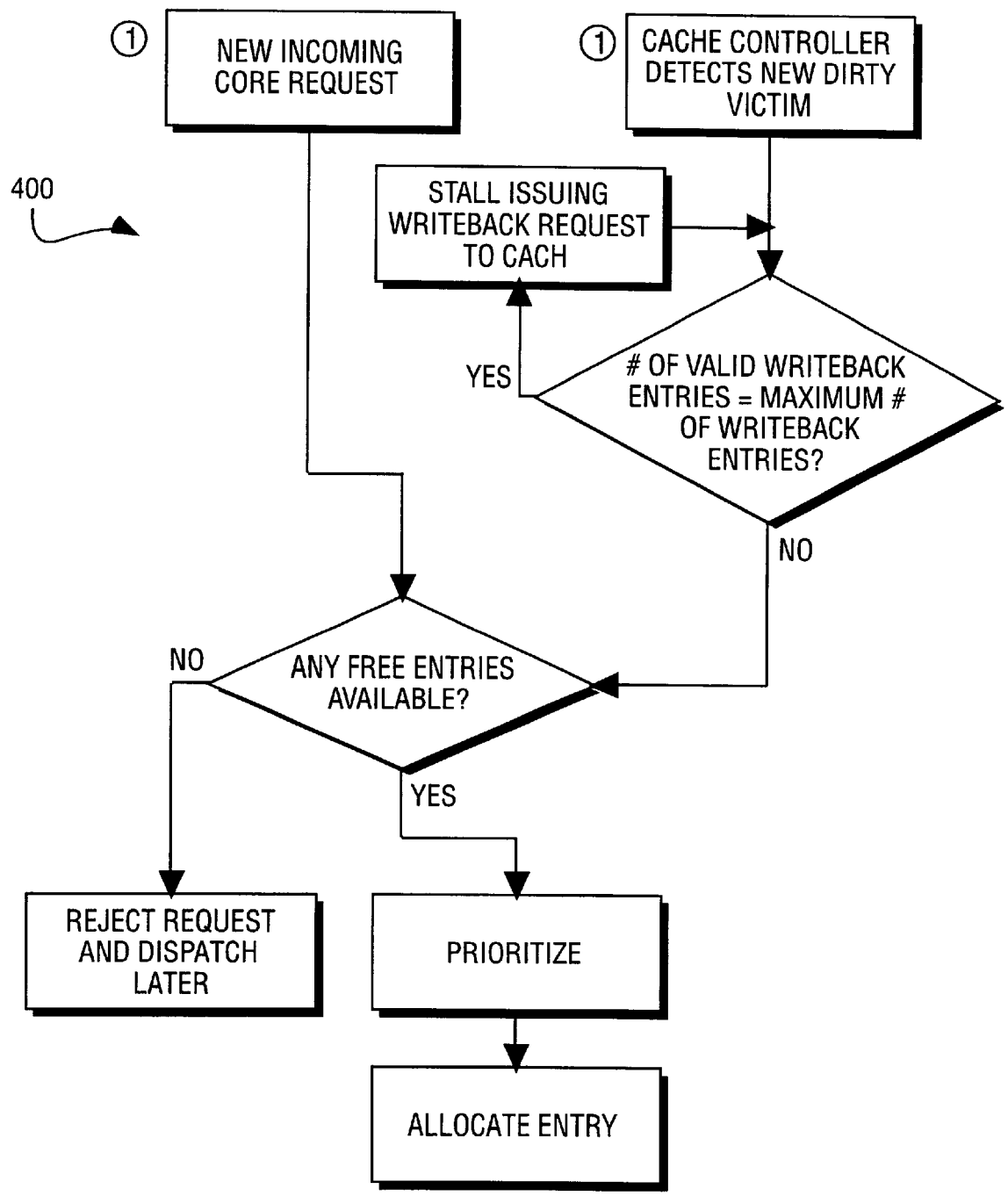
FIG. 4 illustrates an embodiment of the invention using a maximum number of programmable entries for allocation to service writeback evictions.

FIG. 4 illustrates an embodiment of the invention using a single queue implementation where a maximum number of programmable entries are allocated to service writeback evictions. A predetermined limit is used to limit the maximum number of entries that can be used for writebacks. This predetermined limit can be modified depending upon the cache architecture and type of program that is being executed. Once the programmable limit is reached, writeback evictions are stalled, even if there are unallocated queue entries available. Therefore, writebacks can only proceed after one of the writeback entries become available. If there are no writebacks to process, all entries are made available to service incoming core transactions. In this embodiment if the predetermined limit has not been reached and there is only one entry available, a writeback eviction takes higher priority over an incoming core request to use the only free entry. This embodiment is most useful during normal operation when both writebacks and incoming core requests compete for the available queue entries.

In the embodiment in FIG. 4, request entries are left unused if there are no or few incoming core requests and a large amount of writeback transactions are taking place. The number of unused entries approaches the total number of queue entries minus the number set by the predetermined limit. When this happens, a flush intensive program sequence is taking place. Therefore, the embodiment of FIG. 3 would be a better choice. Regardless of whether the embodiment in FIG. 3 or FIG. 4 is used, writeback evictions take higher priority over incoming core requests. Also, writeback evictions can use any queue entry as long as it is available, depending on whether the embodiment in FIG. 3 or FIG. 4 is implemented.

Figure 5:
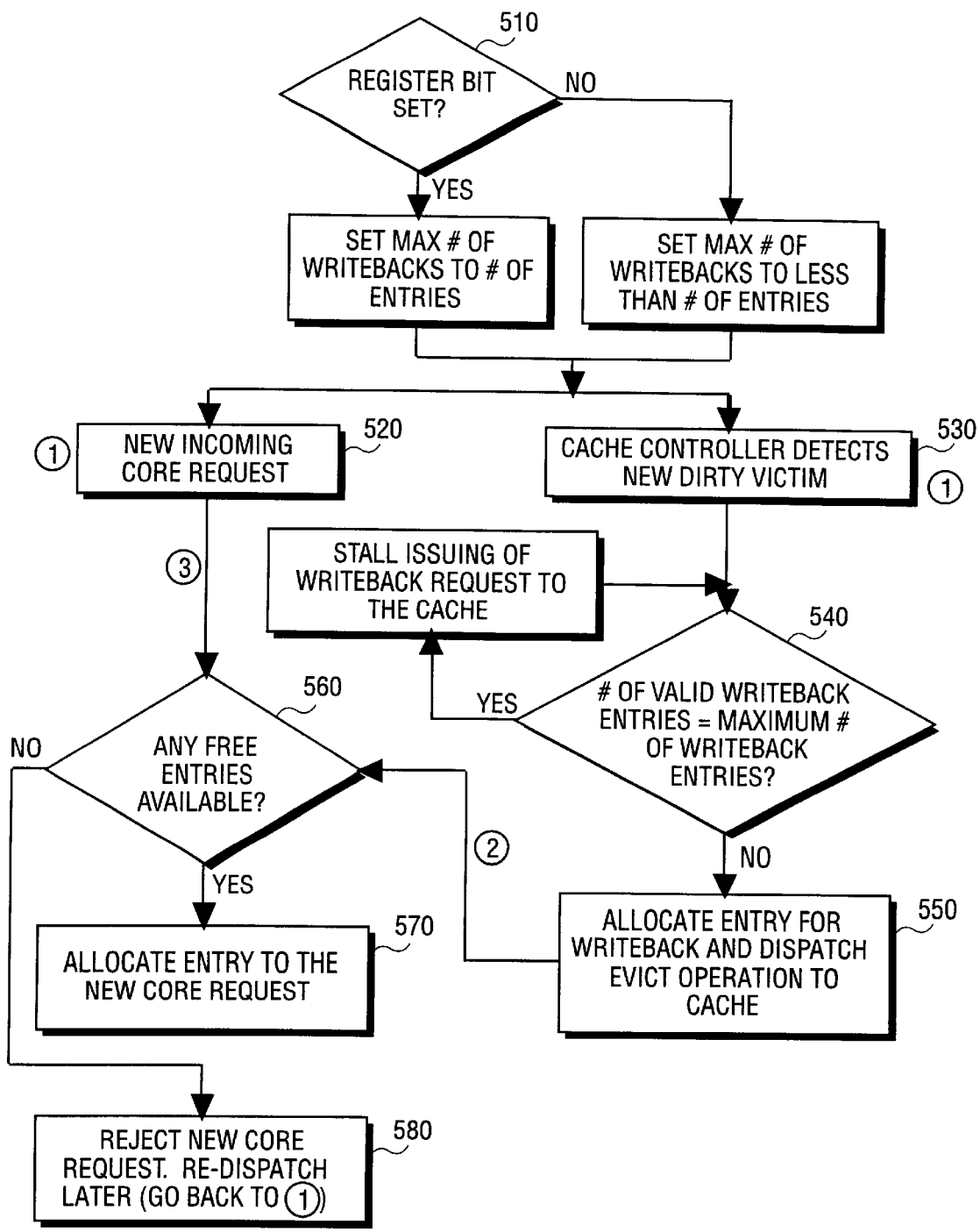
FIG. 5 illustrates an embodiment of the invention where a cache management scheme is dynamically selected between one scheme wherein any and all available entries are used for either writeback evictions or incoming core requests or another scheme wherein a maximum number of programmable entries are allocated to service writeback evictions.

FIG. 5 shows an embodiment configured to dynamically use either the embodiment shown in FIG. 3 or the embodiment shown in FIG. 4. A Control register bit is used to determine which embodiment to use. When block 510 determines that the control register bit is set, the embodiment shown in FIG. 3 is used, that is the maximum number of writebacks entries is set to the total number of entries. When block 510 determines that the control register bit is cleared, the embodiment shown in FIG. 4 is used, that is the maximum number of writeback entries is set to less than the number of entries. The control register bit is typically set when the system is executing a flush intensive sequence, such as a WBINVD macro-instruction, and cleared otherwise. The default setting for the control register bit is cleared, i.e., normal operation. Dynamic switching between the embodiment shown in FIG. 3 and the embodiment shown in FIG. 4 can be implemented with the help of hints from the execution and dispatch units about the state of the system, therefore, increasing overall performance.

As shown in FIG. 5, in blocks 520 and 530 cache controller 205 or 206 simultaneously receives a new cache request and a dirty victim that needs to be evicted from the cache. The latter has a higher priority (regardless of the embodiments shown in FIGS. 3 or 4). In block 540, cache controller 205's or 206's allocation logic determines if it can allocate an entry for the dirty victim. The determination in block 540 is based on a number of factors, such as the maximum number of writeback entries in the cache request queue, the number of writebacks in progress, and mode of operation. In the embodiment illustrated in FIG. 3, the maximum number of writeback entries is equal to the total number of entries. In the embodiment shown in FIG. 4, the maximum number of writeback entries is less than the total number of entries (determined by the predetermined limit).

If all writeback entries are being used, the allocation logic determines that it cannot accept any more writebacks, then stalls the scheduling of the evict operation. The allocation logic continues to stall the evict operation until one of the writeback entries becomes available, if the control register is cleared (using the embodiment shown in FIG. 4), or until any entry becomes available if the control register is set (using the embodiment shown in FIG. 3). Writeback entries become available after writing the dirty victim back to main memory or a cache level farther from the processor. Alternatively, if the allocation logic finds an available entry to service the writeback, block 550 allocates an entry and schedules an evict operation to the cache. In block 560, the allocation logic determines if there are any available entries to accept the new incoming core request. If an available entry exists, the allocation logic accepts the request and block 570 allocates an entry for the new core request, otherwise block 580 rejects the new core request. The requesting agent will have to retry the transaction at a later point of time. The new incoming core request will be accepted once any entry is de-allocated.

The embodiment shown in FIG. 5 can be modified to eliminate deadlocks. A cacheable core request can be de-allocated from the queue entry upon receiving the hit data from the cache, upon receiving the miss information along with the status of the dirty victim, or upon return of the replace data from main memory or a higher level cache. If the core request is not de-allocated from the queue upon receiving a cache miss, the queue entry can enter a deadlock condition where there are no free entries for writebacks from the cache. This deadlock condition is strongly dependent upon the total number of request entries and the latency of the cache. Take for example a scenario where the cache request is not de-allocated upon receiving a miss from the cache. For ease of understanding, assume that the cache request latency is 6 cycles and there are only 6 entries. The queue can accept request entries from the core every cycle. Therefore, in 6 cycles the queue will accept 6 consecutive core requests. Also, for ease of understanding, assume that all of the core requests miss the cache and result in dirty victims. Since all of the request entries are full, writebacks cannot be scheduled, and therefore the core request entries cannot replace the line into the cache resulting in a deadlock condition. If the number of entries and the latency of the cache indicate the possibility of a deadlock condition, it can be eliminated by either allowing one of the entries to be reserved exclusively for writebacks or by de-allocating the core request upon a miss. In the example above, if 1 of the 6 entries is always reserved for writebacks, then after the $5^{th}$ core request, the allocation logic will stall further requests from the core. This allows writebacks due to the cache misses to finish through the reserved writeback entry, therefore, preventing a deadlock condition.

In an alternate embodiment, the deadlock condition can be avoided by deallocating the request upon receiving a miss from the core since an entry is freed every time a request misses the cache. In this embodiment, the cache request queue will allocate another entry for the replace of the data into the cache when the data returns from either main memory or a higher level cache.

Table I shows a performance and die size comparison for different queue embodiments and a typical two queue configuration. The lowest performance and largest die size corresponds to a typical microprocessor configuration having separate queues for writeback and core requests. The highest performance and smallest die size corresponds to a single queue configuration, which dynamically implements embodiments shown in FIG. 3 and FIG. 4 upon demand. The embodiment shown in FIG. 3 is optimal for cache flush intensive applications, while the embodiment shown in FIG. 4 is optimal during normal operation, i.e., a mixture of incoming core requests and writeback evictions.

The embodiment shown in FIG. 4 also provides flexibility for a user to change, on demand, the maximum number of entries allocated for writeback evictions. A typical two-queue configuration would basically have to double the number of queue entries to achieve comparable performance to a configuration providing the highest performance. Also, in cost critical cache controller systems, where the number of queue entries and cache line sizes are large, by using a configuration that dynamically implements embodiments shown in FIGS. 3 and 4, provides a savings in die size. This is accomplished because of a reduction, by almost by one half, in the number of entries needed to achieve equivalent performance to the two queue configuration.

Alternatively, if greater performance is important, and die size cost is not an issue, selecting a system shown in rows 6 or 7 of Table I, provides the highest performance gain as compared to any other configuration with the same number of queue entries.

TABLE I

| Allocation Configuration | Total # of Queue Entries | Maximum # of Writeback Entries | Maximum # of Core Request Entries | Die Size | Performance |
|---|---|---|---|---|---|
| Typical two queue configuration | 16 | 4 | 12 | Largest | Lowest |
| Single Queue (FIG. 3) | 12 | 12 | 12 | Smallest | Use in Flushing Mode |
| Single Queue (FIG. 3) | 16 | 16 | 16 | Largest | Use in Flushing Mode |
| Single Queue (FIG. 4) | 12 | 4 | 12 | Smallest | Use in Regular Mode |
| Single Queue (FIG. 4) | 16 | 4 | 16 | Largest | Use in Regular Mode |
| Single Queue (FIG. 3 and FIG. 4, dynamically implemented) | 12 | 12 (FIG. 3), 4 (FIG. 4) | 12 | Smallest | Highest |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   setting a maximum number of concurrently allocated queue entries in a cache controller to service writeback evictions;
   setting a register bit based on cache requests; and
   dynamically selecting, based on the register bit set, one of a cache management scheme based on a maximum number of programmable writeback entries and a cache management scheme allowing both writeback entries and incoming core requests to be allocated in any free entry based on priority.

2. The method of claim 1, further comprising prioritizing writeback evictions and incoming core requests, wherein a higher priority is given to writeback evictions over incoming core requests.

3. The method of claim 1, wherein the cache controller has a single request queue and a corresponding single set of buffers, and a buffer in the corresponding single set of buffers is capable of servicing one of writeback evictions and core requests.

4. The method of claim 1, wherein the cache management scheme based on a maximum number of programmable writeback entries further comprises:
   detecting a core request;
   detecting a writeback request;
   determining if a number of writeback entries is equal to the maximum number of allowable concurrent writeback evictions; and
   performing one of stalling an issuance of a writeback request to a single cache queue if the number of writeback entries has reached the maximum number of allowable writeback evictions and allocating an entry for a writeback and dispatching an evict operation to the single cache queue if the number of writeback entries is less than the maximum number of allowable writeback evictions.

5. The method of claim 1, wherein the cache management scheme based on a maximum number of programmable writeback entries further comprises:
   detecting a core request and a writeback eviction request simultaneously;
   detecting at least one available entry in a single cache controller queue;
   determining if a number of writeback entries has reached the maximum number of concurrently allocated queue entries to service writeback evictions; and
   stalling an issuance of a writeback eviction request to a single cache controller queue if the number of writeback entries has reached the maximum number of programmable writeback entries and accepting the core request due to available entries.

6. The method of claim 1, wherein the cache management scheme based on a maximum number of programmable writeback entries further comprises:
   detecting a core request and a writeback eviction request simultaneously;
   detecting at least two available entries in a single cache controller queue;
   determining if a number of writeback entries has reached the maximum number of concurrently allocated queue entries to service writeback evictions; and
   accepting both the core request and the writeback eviction request if the number of writeback entries is less than the maximum number of programmable writeback entries.

7. The method of claim 1, wherein the cache management scheme based on a maximum number of programmable writeback entries further comprises:
   detecting a core request and a writeback eviction request simultaneously;
   detecting only one available entry in a single cache controller queue;
   determining if a number of writeback entries has reached the maximum number of concurrently allocated queue entries to service writeback evictions; and
   giving higher priority to the writeback eviction request if the number of writeback entries is less than the maximum number of programmable writeback entries,
   wherein the writeback eviction is accepted and the core request is stalled; and
   re-issuing the stalled core request at a later time if an entry is available.

8. The method of claim 1, wherein the cache management scheme allowing both writeback entries and incoming core requests to be allocated in any free entry based on priority, further comprises:
   detecting a core request;
   detecting a writeback request;
   prioritizing the writeback entry and an incoming core request;
   determining if any entries are available;
   allocating a first entry for a writeback eviction;
   allocating an entry for the incoming core request if a second entry is available; and
   redispatching the incoming core request if no additional entries are available.

9. The method of claim 1, wherein both the cache management scheme allowing both writeback entries and incoming core requests to be allocated in any free entry based on priority and the cache management scheme based on a maximum number of programmable writeback entries, further comprise:
   detecting a core request;
   detecting a writeback request;
   determining if no entries are available in a single cache controller;
   stalling both the core request and the writeback request if no entries are available in the single cache controller.

10. The method of claim 1, wherein both the cache management scheme allowing both writeback entries and incoming core requests to be allocated in any free entry based on priority and the cache management scheme based on a maximum number of programmable writeback entries, wherein at least one entry is reserved in a single cache controller queue for one of servicing writeback evictions and deallocating entries servicing core requests if a cache miss occurs.

11. A method comprising
   setting a maximum number of allowable writeback evictions;
   allocating a plurality of entries in a cache for a plurality of writeback evictions and a plurality of core requests;
   detecting a core request;
   detecting a writeback request;
   determining if a number of writeback entries is equal to the maximum number of allowable writeback evictions;
   stalling an issuance of a writeback request to a single cache queue if the number of writeback entries is equal to the maximum number of allowable writeback evictions;
   allocating an entry for a writeback and dispatching an evict operation to the single cache queue if the number of writeback entries is less than the maximum number of allowable writeback evictions; and
   controlling a queue in a cache controller.

12. The method of claim 11, further comprising prioritizing writeback evictions and incoming core requests, wherein a higher priority is given to writeback evictions over incoming core requests.

13. The method of claim 11, wherein the cache controller has a single request queue and a corresponding single set of buffers, and a buffer in the corresponding single set of buffers is capable of servicing one of writeback evictions and core requests.

14. A computer-readable medium having a sequence of instructions stored thereon, the sequence of instructions, when executed by a processor, causes the processor to perform operations comprising:
   setting a maximum number of concurrently allocated queue entries in a cache controller to service writeback evictions;
   setting a register bit based on cache requests; and
   dynamically selecting, based on the register bit set, one of a cache management scheme based on a maximum number of programmable writeback entries and a cache management scheme allowing both writeback entries and incoming core requests to be allocated based on priority.

15. The computer-readable medium of claim 14, further comprising a sequence of instructions, when executed by a processor, cause the processor to perform prioritizing of writeback evictions and incoming core requests, wherein a higher priority is given to writeback evictions over incoming core requests.

16. The computer-readable medium of claim 14, wherein the cache controller has a single request queue and a corresponding single set of buffers, and a buffer in the corresponding single set of buffers is capable of servicing one of writeback evictions and core requests.

17. The computer-readable medium of claim 14, wherein the cache management scheme based on a maximum number of programmable writeback entries further comprises:

detecting a core request;

detecting a writeback request;

determining if a number of writeback entries is equal to the maximum number of allowable concurrent writeback evictions;

performing one of stalling an issuance of a writeback request to a single cache queue if the number of writeback entries has reached the maximum number of allowable writeback evictions, and allocating an entry for a writeback and dispatching an evict operation to the single cache queue if the number of writeback entries is less than the maximum number of allowable writeback evictions.

18. The computer-readable medium of claim 14, wherein the cache management scheme based on a maximum number of programmable writeback entries further comprises:

detecting a core request and a writeback eviction request simultaneously;

detecting at least one available entry in a single cache controller queue;

determining if a number of writeback entries has reached the maximum number of concurrently allocated queue entries to service writeback evictions; and stalling an issuance of a writeback eviction request to a single cache controller queue if the number of writeback entries has reached the maximum number of programmable writeback entries and accepting the core request due to available entries.

19. The computer-readable medium of claim 14, wherein the cache management scheme based on a maximum number of programmable writeback entries further comprises:

detecting a core request and a writeback eviction request simultaneously;

detecting at least two available entries in a single cache controller queue;

determining if a number of writeback entries has reached the maximum number of concurrently allocated queue entries to service writeback evictions; and accepting both the core request and the writeback eviction request if the number of writeback entries is less than the maximum number of programmable writeback entries.

20. The computer-readable medium of claim 14, wherein the cache management scheme based on a maximum number of programmable writeback entries further comprises:

detecting a core request and a writeback eviction request simultaneously;

detecting only one available entry in a single cache controller queue;

determining if a number of writeback entries has reached the maximum number of concurrently allocated queue entries to service writeback evictions; and giving higher priority to the writeback eviction request if the number of writeback entries is less than the maximum number of programmable writeback entries, wherein the writeback eviction is accepted and the core request is stalled; and re-issuing the stalled core request at a later time if an entry is available.

21. The computer-readable medium of claim 14, wherein the cache management scheme allowing both writeback entries and incoming core requests to be allocated based on priority, further comprises:

detecting a core request;

detecting a writeback request;

prioritizing the writeback entry and an incoming core request;

determining if any entries are available;

allocating a first entry for a writeback eviction;

allocating an entry for the incoming core request if a second entry is available; and redispatching the incoming core request if no additional entries are available.

22. The computer-readable medium of claim 14, wherein both the cache management scheme allowing both writeback entries and incoming core requests to be allocated in any free entry based on priority and the cache management scheme based on a maximum number of programmable writeback entries, further comprise:

detecting a core request;

detecting a writeback request;

determining if no entries are available in a single cache controller;

stalling both the core request and the writeback request if no entries are available in the single cache controller.

23. The computer-readable medium of claim 14, wherein both the cache management scheme allowing both writeback entries and incoming core requests to be allocated in any free entry based on priority, and the cache management scheme based on a maximum number of programmable writeback entries, wherein at least one entry is reserved in a single cache controller queue for one of servicing writeback evictions and deallocating entries servicing core requests if a cache miss occurs.

24. A computer-readable medium having a sequence of instructions stored thereon, the sequence of instructions, when executed by a processor, causes the processor to perform operations comprising:

setting a maximum number of concurrently allocated queue entries to service writeback evictions;

detecting a core request;

detecting a writeback request;

allocating a plurality of entries in a cache for a plurality of writeback evictions and a plurality of core requests;

determining if a number of writeback entries is equal to the maximum number of allowable writeback evictions;

stalling an issuance of a writeback request to a single cache queue if the number of writeback entries is equal to the maximum number of allowable writeback evictions; and allocating an entry for a writeback and dispatching an evict operation to the single cache queue if the number of writeback entries is less than the maximum number of allowable writeback evictions.

25. The computer-readable medium of claim 24, further comprising a sequence of instructions, when executed by a processor, cause the processor to perform prioritizing of writeback evictions and incoming core requests, wherein a higher priority is given to writeback evictions over incoming core requests.

26. The computer-readable medium of claim 24, wherein the cache controller has a single request queue and a corresponding single set of buffers; and a buffer in the corresponding single set of buffers is capable of servicing one of writeback evictions and core requests.

* * * * *